US012229521B2

(12) United States Patent
Malur Srinavasan et al.

(10) Patent No.: US 12,229,521 B2
(45) Date of Patent: Feb. 18, 2025

(54) AUDITING ARTIFICIAL INTELLIGENCE (AI) SYSTEMS THROUGH COMMON SENSE REASONING TASKS

(71) Applicant: FUJITSU LIMITED, Kawasaki (JP)

(72) Inventors: Ramya Malur Srinavasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 17/740,227

(22) Filed: May 9, 2022

(65) Prior Publication Data

US 2023/0359835 A1 Nov. 9, 2023

(51) Int. Cl.
*G06F 40/40* (2020.01)

(52) U.S. Cl.
CPC .................. *G06F 40/40* (2020.01)

(58) Field of Classification Search
CPC ........ G06F 40/40; G06F 40/226; G06F 40/30; G06F 40/216
See application file for complete search history.

(56) References Cited

U.S. PATENT DOCUMENTS

| | | | | | |
|---|---|---|---|---|---|
| 5,073,054 | A | * | 12/1991 | McDowell | G06F 15/0225 708/142 |
| 5,740,243 | A | * | 4/1998 | Rehm | A63F 3/0421 273/272 |
| 2006/0079778 | A1 | * | 4/2006 | Mo | G01S 7/52026 600/447 |
| 2011/0022560 | A1 | * | 1/2011 | Breiter | G06F 9/5027 706/47 |
| 2012/0203752 | A1 | * | 8/2012 | Ha-Thuc | G06F 16/35 707/706 |
| 2014/0045148 | A1 | * | 2/2014 | Ishiyama | G09B 11/00 434/85 |
| 2019/0180375 | A1 | * | 6/2019 | Huang | G06Q 40/06 |
| 2021/0365640 | A1 | * | 11/2021 | Kang | G06F 18/214 |

(Continued)

OTHER PUBLICATIONS

Bill Yuchen Lin et al., Common Sense Beyond English: Evaluating and Improving Multilingual Language Models for Commonsense Reasoning, Department of Computer Science and Information Sciences Institute, University of California, Jun. 13, 2021.

(Continued)

*Primary Examiner* — Daniel C Washburn
*Assistant Examiner* — Paul J. Mueller
(74) *Attorney, Agent, or Firm* — Maschoff Brennan

(57) ABSTRACT

In an example, a method may include obtaining a language model to be audited. The method may include providing one or more common sense tests to the language model. The common sense tests may include one or more complex problems having multiple parameters or multiple answers. The common sense tests may also provide an indication of the ability of the language model to reflect laymen understanding of the world in the processed responses. The method may include obtaining model results based on responses to the language model with respect to the one or more common sense tests. The method may include obtaining one or more proposed changes to the language model based on the model results. The method may include implementing the one or more proposed changes to the language model based on the model results.

18 Claims, 4 Drawing Sheets

(56) References Cited

U.S. PATENT DOCUMENTS

| | | | | |
|---|---|---|---|---|
| 2021/0406478 | A1* | 12/2021 | Klein | G06N 3/045 |
| 2022/0067941 | A1* | 3/2022 | Taleb | G06N 20/00 |
| 2022/0284288 | A1* | 9/2022 | Tolias | G06N 3/08 |

OTHER PUBLICATIONS

Nazneen Fatema Rajani et al., Explain Yourself! Leveraging Language Models for Commonsense Reasoning, Salesforce Research, Palo Alto, California, Jun. 6, 2019.
Wangchungshu Zhou et al., Pre-training Text-to-text Transformers for Concept-Centric Common Sense, Beihang University, University of Southern California, Nov. 25, 2020.
Xiang Lorrain Li, et al., Do Language Models Learn Commonsense Knowledge?, University of Massachusetts Amherst, Feb. 16, 2022.
Xuhui Zhou et al., Evaluating Commonsense in Pre-trained Language Models, University of Washington, School of Engineering, Feb. 11, 2021.
European Search Report issued in corresponding application No. 23167524.0, dated Sep. 18, 2023.
Talmor et al., "CommonsenseQA 2.0: Exposing the Limits of AI through Gamification," 35th Conference on Neural Information Processing Systems, pp. 1-14, Dec. 6-14, 2021.
Emelin et al., "Moral Stories: Situated Reasoning about Norms, Intents, Actions, and their Consequences," arXiv preprint arXiv:2012, pp. 1-21, Dec. 31, 2020.
Jiang et al., "DELPHI: Towards Machine Ethics and Norms," arXiv preprint arXiv:2110.07574, pp. 1-42, Oct. 14, 2021.
Qin et al., "TIMEDIAL: Temporal Commonsense Reasoning in Dialog, " arXiv preprint arXiv:2106.04571, pp. 1-15, Jun. 8, 2021.
Shu et al., "AGENT: A Benchmark for Core Psychological Reasoning," arXiv preprint arXiv:2102.12321, pp. 1-12, Jul. 26, 2021.
Hendrycks et al., "Aligning AI With Shared Human Values," arXiv preprint arXiv:2008.02275, pp. 1-29, Aug. 5, 2020.
Lin et al., "RiddleSense: Reasoning about Riddle Questions Featuring Linguistic Creativity and Commonsense Knowledge," arXiv preprint arXiv:2101.00376v2, pp. 1-12, Jul. 4, 2021.
He et al., "Pun Generation with Surprise," arXiv preprint arXiv:1904.06828v1, pp. 1-11, Apr. 15, 2019.
Talmor et al., "MULTIQA: An Empirical Investigation of Generalization and Transfer in Reading Comprehension." arXiv preprint arXiv:1905.13453v1, pp. 1-11, May 31, 2019.
Rajpurkar et al., "Know What You Don't Know: Unanswerable Questions for SQuAD," arXiv preprint arXiv:1806.03822v1, pp. 1-9, Jun. 11, 2018.
Kelley et al., "Common-Sense Psychology and Scientific Psychology," Annu. Rev. Psychol 1992, 43:1-23, Feb. 1992.
Wegner et al., "Implicit Psychology: An Introduction to Social Cognition," Chapter 10, pp. 225-246, Oct. 20, 1977.
Ilievski et al., "Dimensions of Commonsense Knowledge," arXiv preprint arXiv:2101.04640v2, pp. 1-21, Jul. 29, 2021.
Zhu et al. "Dark, Beyond Deep: A Paradigm Shift to Cognitive AI with Humanlike Common Sense," Engineering, vol. 6, Issue 3, pp. 310-345, Feb. 22, 2020.
Sternberg et al., "Testing Common Sense," American Psychologist, vol. 50, No. 11, pp. 912-927, Nov. 1, 1995.
Razzle Puzzles, "Cryptograms," https://api.razzlepuzzles.com/cryptogram, accessed May 9, 2022.
Lin et al., "TruthfulQA: Measuring How Models Mimic Human Falsehoods," arXiv preprint arXiv:2109.07958, pp. 1-35, Sep. 8, 2021.
EP Office Action dated Sep. 5, 2024 in application 23167524.0-1203.

* cited by examiner

AUDITING ARTIFICIAL INTELLIGENCE (AI) SYSTEMS THROUGH COMMON SENSE REASONING TASKS

FIELD

The embodiments discussed in the present disclosure are related to auditing AI systems through common sense reasoning tasks.

BACKGROUND

Unless otherwise indicated in the present disclosure, the materials described in the present disclosure are not prior art to the claims in the present application and are not admitted to be prior art by inclusion in this section.

Language models have been developed to interpret, respond to, and/or otherwise interact with various language inputs. Although language models may be developed to mimic a natural use of the language (e.g., attempting to operate in a similar manner as a human might), some language models may include biases or may respond in a nonsensical manner.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

According to an aspect of an embodiment, a method of auditing an AI system may include obtaining a language model to be audited to determine an ability of the language model to incorporate common sense into processed responses performed by the language model. The method may also include providing one or more common sense tests to the language model. The common sense tests may include one or more complex problems having multiple parameters or multiple answers. The common sense tests may further provide an indication of the ability of the language model to reflect laymen understanding of the world in the processed responses. The method may include obtaining model results based on responses of the language model with respect to the one or more common sense tests. The method may also include obtaining one or more proposed changes to the language model based on the model results. The method may further include implementing the one or more proposed changes to the language model based on the model results.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
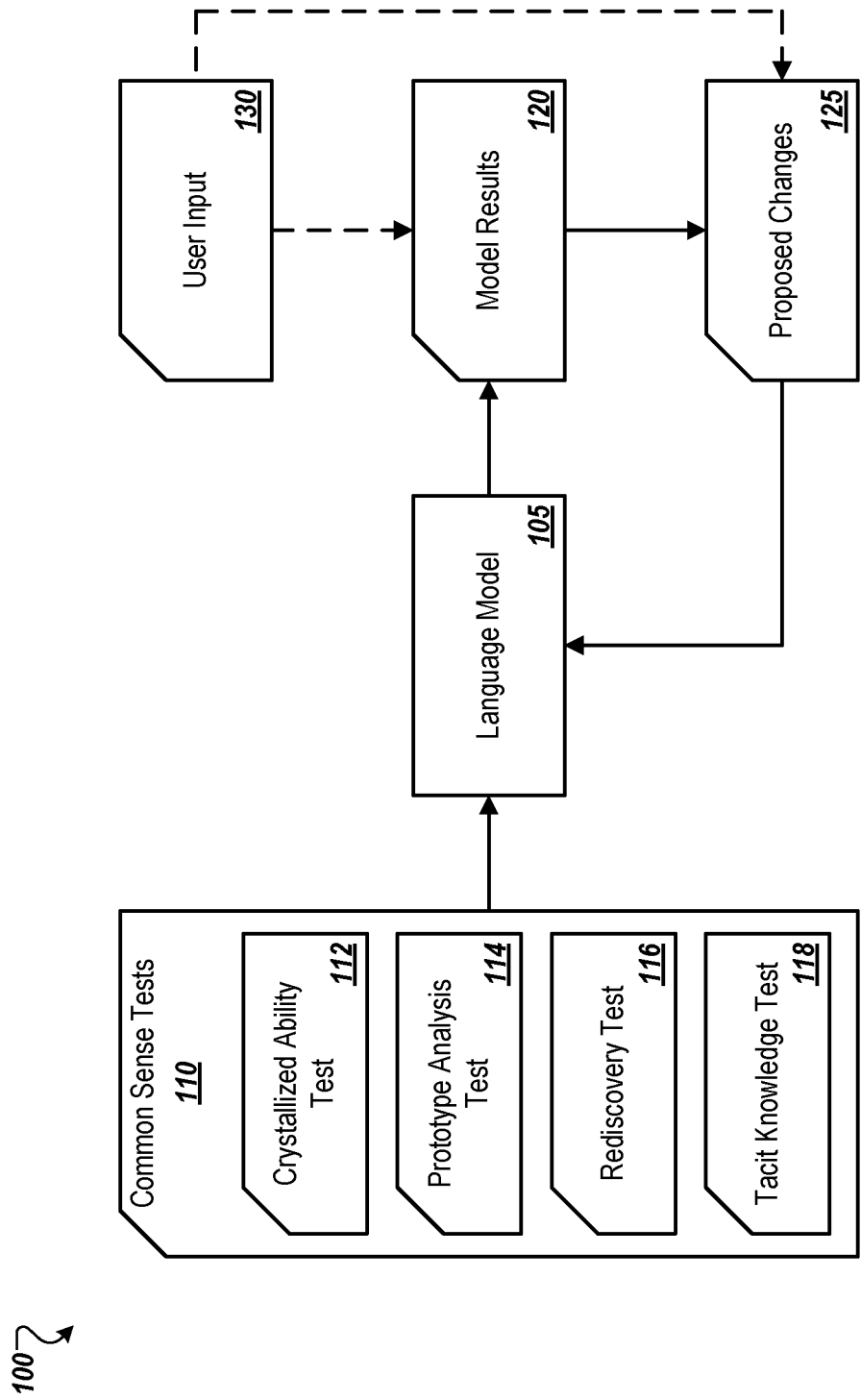
FIG. 1 is a block diagram of an example operating environment that includes a language model and is configured to perform an audit of the language model through common sense reasoning tasks.

Language models are designed to predict letters, words, or sequences of words, often based on an association between the words and likelihoods of certain words appearing adjacent to or near other words. Some language models implement artificial intelligence (AI) in an attempt to improve the language model and/or the results of the language model. For example, a language model may implement natural language processing with a goal to make the language model capable of understanding text in a similar fashion as a human might. Some examples of language models include n-gram, generative pre-trained transformer (GPT)-2, GPT-3, bidirectional encoder representations from transformers (BERT), XLNet, and the like.

Language analysis, understanding, or presentation (e.g., the use of certain words or phrases) may often be influenced by common sense of users of language. As such, a language model's ability to accurately perform language processing may include the ability of the language model to incorporate common sense principles into its analysis. In the present disclosure, the term "common sense" may include a relationship between a layman's understanding of the world and how that understanding informs one or more decisions, including those related to language selection and analysis.

Language models are often trained and tested based on problems to be solved that may be well-defined and may include only a single correct solution. However, practical problems for training and/or testing common sense may include complex problems that may not be well-defined and/or may include more than one solution. As such, in some instances, language models may provide outputs that may have a logical basis to them, but that may be nonsensical from a real-world perspective (e.g., as understood by a human) because of a lack of ability to apply common sense principals by the processing performed. Language models may accordingly benefit from an audit, which audit may contribute to determining whether the language model includes common sense. In the present disclosure reference to whether a language model "includes common sense" may refer to the language model's ability to perform processing that incorporates common sense principals.

Accordingly, in some embodiments of the present disclosure, operations may be directed toward auditing language models to determine a degree of common sense included in the language model. In these or other embodiments, the auditing may include providing one or more common sense tests to a language model. The common sense tests may include tests that may include complex problems (e.g., problems with multiple parameters) and/or tests that may be ill-defined, such that the tests may include more than one answer. In some embodiments, the operations may include obtaining model results based on the responses of the language model. In these or other embodiments, one or more proposed changes to the language model may be obtained, in which the proposed changes may be based on the model results. Alternatively, or additionally, the operations may further include implementing the one or more proposed changes with the language model such that the language model may be improved to provide answers that better conform with common sense language use and processing.

Embodiments of the present disclosure will be explained with reference to the accompanying drawings.

FIG. 1 is a block diagram of an example operating environment 100 that includes a language model that is configured to perform an audit of the language model through common sense reasoning tasks, in accordance with at least one embodiment of the present disclosure. The operating environment 100 may include a language model 105 which may receive various inputs and generate various outputs, as described herein.

In some embodiments, the language model 105 may include any computer implemented system configured to perform natural language processing or similar language analysis and/or response. For example, the language model 105 may be configured to provide recommendations based on textual input, perform human-like conversations, provide responses to questions, and the like. The language model 105 may include a well-known and/or widely used language model such as Bidirectional Encoder Representations from Transformers (BERT) or Generative Pre-trained Transformer 3 (GPT-3). Alternatively, or additionally, the language model 105 may include variations of previously developed models and/or may include newly developed language models. In these and other embodiments, the language model 105 may be configured to receive inputs and generate outputs based on the received inputs.

In some embodiments, it may be desirable to audit the language model 105 to determine whether the language model 105 exhibits common sense reasoning and/or a degree of common sense reasoning exhibited in the language model 105. In the present disclosure, common sense and/or common sense reasoning may include a relationship between a layman's understand of the world and how that understanding informs one or more decisions, including decisions related to language selection and analysis.

Auditing the language model 105 to determine the common sense reasoning associated therewith may include inputting one or more common sense tests 110 into the language model 105. The common sense tests 110 may include tasks that are directed at determining a degree of common sense reasoning the language model 105 exhibits. For example, the common sense tests 110 may include providing the language model 105 with performing a task (e.g., based on a certain input) directed at determining the abilities of the language model 105 to apply learning (e.g., as opposed to or in addition to logical reasoning based on inferences) to puzzles (e.g., cryptograms), determine relationships between words and phrases including contextual overtones, provide proverbial summaries of text, and/or determine responses to complex antecedent inputs.

In some embodiments, the common sense tests 110 may include a crystallized ability test 112, a prototype analysis test 114, a rediscovery test 116, and/or a tacit knowledge test 118. Although the common sense tests 110 are illustrated and described as four common sense tests, it may be understood that other tests may be developed and/or directed to test the same or similar aspects as the crystallized ability test 112, the prototype analysis test 114, the rediscovery test 116, and/or the tacit knowledge test 118. Alternatively, or additionally, more or fewer tests may be included in the common sense tests 110, as needed, to contribute to determining common sense reasoning associated with the language model 105.

Generally, the common sense tests 110 may include an input to the language model 105, which may result in an output from the language model 105, including model results 120. In some embodiments, the input may include a complex problem having multiple input parameters and/or that may include multiple possible outputs. For example, the common sense tests 110 may include providing multiple input parameters to the language model 105 such as a textual description and a query instance and/or complex antecedents (e.g., multiple "if" statements), which are further described below. In another example, the common sense tests 110 may result in obtaining multiple possible outputs from the language model 105 such as a cipher and associated steps in obtaining the cipher, two or more descriptors (e.g., horizontal and vertical) associated with an inputs, two or more proverbs that may summarize an input, and the like, all of which are further described below. In some embodiments, the model results 120 may be associated with portions of the common sense tests 110 that the language model 105 fails to provide a response including common sense reasoning. Based on the model results 120, proposed changes 125 may be recommended to the language model 105 which may be directed at improving the language model 105. In these and other embodiments, the proposed changes 125 may be in response to the model results 120 associated with the language model 105 not passing the common sense tests 110 presented to the language model 105.

In some embodiments, the model results 120 and/or the proposed changes 125 may include user input, as described herein. Alternatively, or additionally, the model results 120 and/or the proposed changes 125 may be semi-autonomous or autonomous, as described herein.

In some embodiments, the crystallized ability test 112 may include a complex problem that may include multiple steps to reach a solution. For example, the crystallized ability test 112 may include an unsolved cryptogram in which an encoded textual description includes encoded letters that upon determining a cipher, the encoded letters may be decoded to determine the textual description. In some embodiments, the crystallized ability test 112 may indicate one or more steps taken by the language model 105 as the language model 105 determines the cipher. For example, the crystallized ability test 112 may indicate steps taken by the language model 105 to determine a first encoded letter to be the letter 'a' upon decoding, a second encoded letter to be the letter 'b' upon decoding, and so forth.

In some embodiments, the letters of the textual description may be encoded without following an underlying rule, such that decoding each letter of the textual description may include additional steps beyond determining a decoding rule and applying the decoding rule to the encoded textual description. In these and other embodiments, the crystallized ability test 112 may be configured to audit at least an aspect of common sense reasoning associated with the language model 105. For example, the crystallized ability test 112 may be configured to determine how the language model 105 may apply learning, such as machine learning, to solve a puzzle including evaluating steps taken by the language model 105 to obtain the solution.

In some embodiments, the crystallized ability test 112 may include a request to the language model 105 for an explanation for actions taken at a step in the decoding process. For example, the language model 105 may produce one or more explanations as to a reason for a selection of decoded letters in the encoded textual description in response to the crystallized ability test 112.

In these and other embodiments, the model results 120 may include an output of the language model 105 in response to the crystallized ability test 112. The model results 120 may be associated with or an indication of the common sense reasoning of the language model 105 in view of the crystallized ability test 112. For example, the model results 120 associated with the crystallized ability test 112 may include the decoded textual description, the steps taken by the language model 105 to obtain the decoded textual description, and/or one or more explanation associated with the steps.

In instances in which the language model 105 passes the crystallized ability test 112, it may be determined that the language model 105 includes at least a degree of common sense reasoning. The language model 105 may be considered to pass the crystallized ability test 112 in instances in which the decoded textual description includes readable text and/or logical steps in reaching the decoded textual description. In some embodiments, user input 130 may contribute to determining whether the language model 105 passes the crystallized ability test 112. For example, a user may observe the decoded textual description and/or the logical steps employed and determine if the model results 120 are sensical.

Alternatively, or additionally, the determination as to whether the language model 105 passes the crystallized ability test 112 may be autonomous. For example, a system or device may compare the model results 120 to data within a data storage, and may make a determination regarding the common sense reasoning of the language model 105. The data in the data storage may include a collection of common phrases, quotes, and the like.

Alternatively, or additionally, the determination as to whether the language model 105 passes the crystallized ability test 112 may be semi-autonomous. For example, upon making a determination regarding the common sense reasoning of the language model 105 with respect to the crystallized ability test 112, a system or device may present the determination to a user for validation.

In instances in which the language model 105 does not pass the crystallized ability test 112 (e.g., the language model 105 partially fails, substantially fails, and/or completely fails, or generally referred to as "fails," the crystallized ability tests 112), it may be determined that the language model 105 may be lacking at least a degree of common sense reasoning. The language model 105 may be considered to fail the crystallized ability test 112 in instances in which the decoded textual description does not include readable or sensical text and/or the steps taken in reaching the decoded textual description are nonsensical or haphazard.

Alternatively, or additionally, in instances in which the language model 105 fails the crystallized ability test 112, one or more proposed changes, such as the proposed changes 125, may be directed to improving the common sense reasoning of the language model 105. Additional details directed to the proposed changes 125 are described further below.

In some embodiments, the prototype analysis test 114 may include providing a textual description and an associated query instance to the language model 105 to obtain the model results 120 including an updated textual description and an updated query instance. The model results 120 for the prototype analysis test 114 may include one or more first descriptors related to the query instance, one or more second descriptors related to the query instance, and/or an updated textual description that may include at least one of the first descriptors or the second descriptors.

In some embodiments, the first descriptors may include a first relationship to the query instance. The first relationship may include a vertical dimension associated with the query instance which may include a taxonomically linguistic relationship with the query instance. For example, the first descriptors may include a hierarchical relationship to the query instance. For example, in instances in which the query instance is love, the first descriptors may include attraction, respect, filial love, etc.

In some embodiments, the second descriptors may include a second relationship to the query instances. The second relationship may include a horizontal dimension associated with the query instance which may include illustrative applications of the query instance. For example, the second descriptors may include one or more manifestations of the query instance. For example, in instances in which the query instance is love, the second descriptors may include caring, harmony, protectiveness, etc.

In some embodiments, the updated textual description may be similar to the textual description and may include an updated query instance in place of the query instance. For example, in instances in which the textual description is "His face was red in anger" and the query instance is "anger," the updated textual description may be "His face was red in rage." Alternatively, or additionally, the updated textual description may include one or more changes to words included in the textual description. For example, in instances in which the textual description is "He really loves that car" and the query instance is "loves," the updated textual description may be "He really cares for that car," which includes an updated query instance and an additional word for accuracy.

In these and other embodiments, the prototype analysis test 114 may be configured to audit at least an aspect of common sense reasoning associated with the language model 105. For example, the prototype analysis test 114 may be configured to determine the ability of the language model 105 to determine one or more related descriptors having one or more relationships (e.g., vertical and/or horizontal) with a query instance and generating an updated textual description using the related descriptors such that the updated textual description includes a similar meaning as an original textual description.

In some embodiments, the prototype analysis test 114 may include a request to the language model 105 for a justification of the first descriptors, the second descriptors, and/or the updated textual description. For example, the language model 105 may produce one or more justifications as to a reason for a selection of the first descriptors, the second descriptors, and/or the updated textual description in response to the prototype analysis test 114.

In these and other embodiments, the model results 120 may include an output of the language model 105 in response to the prototype analysis test 114. The model results 120 may be associated with or an indication of the common sense reasoning of the language model 105 in view of the prototype analysis test 114. For example, the model results 120 associated with the prototype analysis test 114 may include the first descriptors, the second descriptors, the updated textual description, and/or the justification of the language model 105 in selecting the first descriptors, the second descriptors, and/or the updated textual description.

In instances in which the language model 105 passes the prototype analysis test 114, it may be determined that the language model 105 includes at least a degree of common sense reasoning. The language model 105 may be considered to pass the prototype analysis test 114 in instances in which the first descriptors and/or the second descriptors include the first relationship and/or the second relationship, respectively, to the query instance, and/or the updated textual description includes a similar context and meaning as the textual description.

In these and other embodiments, determining the model results 120 relative to the prototype analysis test 114 may include manual, autonomous, or semi-autonomous operations. For example, a user may review the model results 120 associated with the prototype analysis test 114 and may determine if the first descriptors include the first relationship relative to the query instance, the second descriptors include the second relationship relative to the query instance, and/or if the updated textual description includes a similar context and meaning as the textual description.

Alternatively, or additionally, the determination as to whether the language model 105 passes the prototype analysis test 114 may be autonomous. For example, the first descriptors and the second descriptors may be autonomously compared to data in a data storage to determine whether the first descriptors and the second descriptors include the first relationship and the second relationship, respectively, to the query instance.

Alternatively, or additionally, the determination as to whether the language model 105 passes the prototype analysis test 114 may be semi-autonomous. For example, upon making a determination regarding the common sense reasoning of the language model 105 with respect to the prototype analysis test 114, a system or device may present the determination to a user for validation.

In instances in which the language model 105 does not pass the prototype analysis test 114, it may be determined that the language model 105 may be lacking at least a degree of common sense reasoning. The language model 105 may be considered to fail the prototype analysis test 114 in instances in which the first descriptors and/or the second descriptors do not include the first relationship and/or the second relationship, respectively, to the query instance, and/or the updated textual description does not include a similar context and meaning as the textual description.

Alternatively, or additionally, in instances in which the language model 105 fails the prototype analysis test 114, one or more proposed changes, such as the proposed changes 125, may be directed to improving the common sense reasoning of the language model 105. Additional details directed to the proposed changes 125 are described in further detail below.

In some embodiments, the rediscovery test 116 may include providing a textual description to the language model 105 to obtain the model results 120 including a proverbial summary of the textual description. In some embodiments, the model results 120 for the rediscovery test 116 may include a first proverb that may include a summary of the textual description, a second proverb that may include an opposite summary of the textual description, and/or a third proverb that may include a summary of the textual description in a different language from the first proverb. Alternatively, or additionally, instances may exist where a textual description may be ill-defined, such that the textual description may not be summarized with a proverb, such that the model results 120 may include no proverb, and/or the textual description may be summarized by more than one proverb, such that the model results 120 may include multiple proverbs, or where multiple proverbs may be considered a passing result for the model results 120.

In an example, a textual description may be "Amy and Asha decided to surprise their teacher by composing a birthday song for her. Other kids also liked the idea and joined in to help Amy and Asha. What started as an exciting activity now seemed to be going all around with each kid suggesting their own idea and new lyrics." In response to the textual description, the language model 105 may determine a first proverb may be "too many cooks spoil the broth," a second proverb may be "many hands make light work," and a third French proverb may be "quand it y a plusieurs cuisiniers, la soupe est trop salée," which may approximately translate to "when there are many cooks, the soup is too salty."

In these and other embodiments, the rediscovery test 116 may be configured to audit at least an aspect of common sense reasoning associated with the language model 105. For example, the rediscovery test 116 may be configured to determine the ability of the language model 105 to determine and/or summarize a meaning of a textual description using one or more proverbs.

In these and other embodiments, the model results 120 may include an output of the language model 105 in response to the rediscovery test 116. The model results 120 may be associated with or an indication of the common sense reasoning of the language model 105 in view of the rediscovery test 116. For example, the model results 120 associated with the rediscovery test 116 may include the first proverb, the second proverb, and/or the third proverb.

In instances in which the language model 105 passes the rediscovery test 116, it may be determined that the language model 105 includes at least a degree of common sense reasoning. The language model 105 may be considered to pass the rediscovery test 116 in instances in which the first proverb summarizes the textual description, the second proverb summarizes the opposite of the textual description, and/or the third proverb summarizes the textual description in a different language from the first proverb.

In these and other embodiments, determining the model results 120 relative to the rediscovery test 116 may include manual, autonomous, or semi-autonomous operations. For example, a user may review the model results 120 associated with the rediscovery test 116 and may determine if the first proverb summarizes the textual description, the second proverb summarizes the opposite of the textual description, and/or the third proverb summarizes the textual description in a different language from the first proverb.

Alternatively, or additionally, the determination as to whether the language model 105 passes the rediscovery test 116 may be autonomous. For example, the first proverb, the second proverb, and/or the third proverb may be autonomously compared to data in a data storage to determine whether the first proverb, the second proverb, and/or the third proverb summarize the textual description or summarize the opposite of the textual description.

Alternatively, or additionally, the determination as to whether the language model 105 passes the rediscovery test 116 may be semi-autonomous. For example, upon making a determination regarding the common sense reasoning of the language model 105 with respect to the rediscovery test 116, a system or device may present the determination to a user for validation.

In instances in which the language model 105 does not pass the rediscovery test 116, it may be determined that the language model 105 may be lacking at least a degree of common sense reasoning. The language model 105 may be considered to fail the rediscovery test 116 in instances in which the first proverb does not summarize the textual description, the second proverb does not summarize the opposite of the textual description, and/or the third proverb does not summarize the textual description in a different language from the first proverb. Alternatively, or additionally, the language model 105 may be considered to fail the rediscovery test 116 in instances in which the language model 105 produces a nonsensical first proverb, second proverb, and/or third proverb, including in instances in which no proverb may exist for the textual description.

Alternatively, or additionally, in instances in which the language model 105 fails the rediscovery test 116, one or more proposed changes, such as the proposed changes 125, may be directed to improving the common sense reasoning of the language model 105. Additional details directed to the proposed changes 125 are described herein.

In some embodiments, the tacit knowledge test 118 may include providing one or more antecedent conditions to the language model 105 to obtain model results 120 including consequent actions in response to the antecedent conditions.

In some embodiments, the antecedent conditions (or antecedents) of the tacit knowledge test 118 may include one or more "if" statements and the consequent actions (or consequences) may include one or more "then" statements. Accordingly, the tacit knowledge test 118 may include providing one or more "if" statements as antecedents to the language model 105 and the language model 105 may generate one or more "then" statements as consequences in response. In some embodiments, the language model 105 may generate a number of consequences that may be equal to the number of antecedents input into the language model 105. Alternatively, or additionally, the language model 105 may generate more or less consequences than the number of antecedents input into the language model 105. For example, two "if" statements may be included in the tacit knowledge test 118 and in response, the language model 105 may generate one "then" statement. In another example, two "if" statements may be included in the tacit knowledge test 118 and in response, the language model 105 may generate three "then" statements. The foregoing examples are provided merely as examples and any number of "if" statements may be provided as part of the tacit knowledge test 118 and any number of "then" statements may be generated by the language model 105 in response.

In these and other embodiments, the tacit knowledge test 118 may be configured to audit at least an aspect of common sense reasoning associated with the language model 105. For example, the tacit knowledge test 118 may be configured to determine the ability of the language model 105 to respond to complex antecedents (e.g., multiple "if" statements).

In these and other embodiments, the model results 120 may include an output of the language model 105 in response to the tacit knowledge test 118. The model results 120 may be associated with or an indication of the common sense reasoning of the language model 105 in view of the tacit knowledge test 118. For example, the model results 120 associated with the tacit knowledge test 118 may include the consequences in response to the antecedents.

In instances in which the language model 105 passes the tacit knowledge test 118, it may be determined that the language model 105 includes at least a degree of common sense reasoning. The language model 105 may be considered to pass the tacit knowledge test 118 in instances in which the consequences include responsive actions and/or sentiments to the antecedents. For example, in an instance in which the antecedents include "if it is raining and if the milk has not yet arrived," a consequence that may pass the tacit knowledge test 118 may include "then carry an umbrella and walk to the milk dairy." In another example, using the same antecedents, a consequence that may not pass the tacit knowledge test 118 may include "then you can add a new entry to the list," as the consequence appears unresponsive to and/or irrespective of the antecedents.

In these and other embodiments, determining the model results 120 relative to the tacit knowledge test 118 may include manual, autonomous, or semi-autonomous operations. For example, a user may review the model results 120 associated with the tacit knowledge test 118 and may determine if the consequences are responsive to the antecedents.

Alternatively, or additionally, the determination as to whether the language model 105 passes the tacit knowledge test 118 may be autonomous. For example, the consequences may be autonomously compared to data in a data storage to determine whether the consequences are responsive to the antecedents.

Alternatively, or additionally, the determination as to whether the language model 105 passes the tacit knowledge test 118 may be semi-autonomous. For example, upon making a determination regarding the common sense reasoning of the language model 105 with respect to the tacit knowledge test 118, a system or device may present the determination to a user for validation.

In instances in which the language model 105 does not pass the tacit knowledge test 118, it may be determined that the language model 105 may be lacking at least a degree of common sense reasoning. The language model 105 may be considered to fail the tacit knowledge test 118 in instances in which the consequences may not be responsive actions and/or sentiments to the antecedents. Alternatively, or additionally, the language model 105 may be considered to fail the tacit knowledge test 118 in instances in which the consequences are responsive to a first antecedent, but may be nonsensical or unresponsive to a second antecedent.

Alternatively, or additionally, in instances in which the language model 105 fails the tacit knowledge test 118, one or more proposed changes, such as the proposed changes 125, may be directed to improving the common sense reasoning of the language model 105. Additional details directed to the proposed changes 125 are described herein.

In some embodiments, the proposed changes 125 may be generated in response to the model results 120. For example, in instances in which the model results 120 produced by the language model 105 include failures to one or more of the common sense tests 110, the proposed changes 125 may include one or more actions that may be taken directed at improving the language model 105 to pass future common sense tests 110. In these and other embodiments, the proposed changes 125 may be generated in response to the language model 105 failing one or more of the common sense tests 110. For example, in instances in which the language model 105 fails the prototype analysis test 114 and the tacit knowledge test 118, the proposed changes 125 may include one or more recommendations to improve the language model 105 at least with respect to the prototype analysis test 114 and the tacit knowledge test 118.

In some embodiments, the language model 105 may be designed for and/or tuned for operations in a setting. For example, a first language model 105 may be designed for operations within a banking setting and a second language model 105 may be designed for operations within a healthcare setting. In some embodiments, a numeric may be associated with each of the common sense tests 110 to obtain a robustness score of the language model 105 relative to the setting.

In these and other embodiments, one or more weights (e.g., the numeric) may be applied to the model results 120 such that a robustness score relative to the performance of the language model 105 in the setting may be determined. For example, in a first setting, the crystallized ability test 112 may carry more weight than the other common sense tests 110 and in a second setting, the tacit knowledge test 118 may carry more weight than the other common sense tests 110. In some embodiments, the robustness score may provide an indication of a readiness of the language model 105 to be used in the setting. For example, in instances in which a first language model receives a first robustness score above a threshold and a second language model receives a second robustness score below the threshold, the first language model may be determined to be ready for implementation in the setting and the second language model may be determined to not be ready for implementation in the setting. In another example, the second language model with the second robustness score below the threshold may receive and/or implement one or more proposed changes before the second language model is ready for implementation in the setting.

In some embodiments, the proposed changes 125 may be the same or similar for each test in the common sense tests 110. For example, the proposed changes 125 associated with a failed response to the crystallized ability test 112 and the proposed changes 125 associated with a failed response to the prototype analysis test 114 may both include updating a structural knowledge of the world through causal graphs.

Alternatively, or additionally, the proposed changes 125 may vary with respect to each of the common sense tests 110. For example, as described above, the proposed changes 125 associated with a failed response to the crystallized ability test 112 may include updating a structural knowledge of the world via causal graphs and the proposed changes 125 associated with a failed response to the rediscovery test 116 may include expanding training data across socio-cultural and/or geographic contexts.

Alternatively, or additionally, the proposed changes 125 may vary with respect to different failures associated with the common sense tests 110. For example, the language model 105 that generates a sensical first proverb and a nonsensical third proverb in response to the rediscovery test 116 may include proposed changes 125 that differ from the language model 105 that generates a nonsensical first proverb and a nonsensical third proverb in response to the rediscovery test 116.

Some general examples of the proposed changes 125 may include updating structural knowledge of the world through causal graphs, expanding training data to include cognitive states and/or behaviors, expanding training data across socio-cultural and/or geographic contexts, and/or validating distribution datasets. In some embodiments, one or more of the proposed changes 125 may be implemented in the language model 105 in response to the language model 105 failing one or more of the common sense tests 110.

In these and other embodiments, determining the proposed changes 125 relative to the model results 120 may include manual, autonomous, or semi-autonomous operations. For example, a user may review the model results 120 associated with the common sense tests 110 and may determine one or more recommendations for the language model 105 to implement which may improve the common sense reasoning of the language model 105, such that the language model 105 may be more likely to pass the common sense tests 110 in future evaluations.

Alternatively, or additionally, the proposed changes 125 may be generated autonomously in response to the model results 120. For example, in instances in which the language model 105 fails the crystallized ability test 112, the proposed changes 125 may include one or more automatically generated recommendations directed at improving the language model 105 and the ability thereof to solve the crystallized ability test 112. For example, the proposed changes 125 may include a recommendation to update a structural knowledge of the world via causal graphs.

Alternatively, or additionally, the proposed changes 125 may be generated semi-autonomously in response to the model results 120. For example, upon automatically generating recommendations directed at improving the language model 105 with respect to the common sense tests 110, a system or device may present the recommendations to a user for validation.

In some embodiments, the proposed changes 125 may be implemented in the language model 105 as described herein. In some embodiments, implementing the proposed changes 125 in the language model 105 may include modifying algorithms, updating databases, creating new or additional relationships between existing structural knowledge, etc. In some embodiments, the proposed changes 125 may be implemented automatically in the language model 105. For example, upon receiving the proposed changes 125, the language model 105 may implement the proposed changes 125. Alternatively, or additionally, the proposed changes 125 may be implemented manually or semi-autonomously. For example, upon receiving the proposed changes 125, the language model 105 may propose changes to be made which changes may be validated by a user of the language model 105.

Modifications, additions, or omissions may be made to the operating environment 100 without departing from the scope of the present disclosure. For example, in some embodiments, the operating environment 100 may include any number of other components that may not be explicitly illustrated or described.

Figure 2:
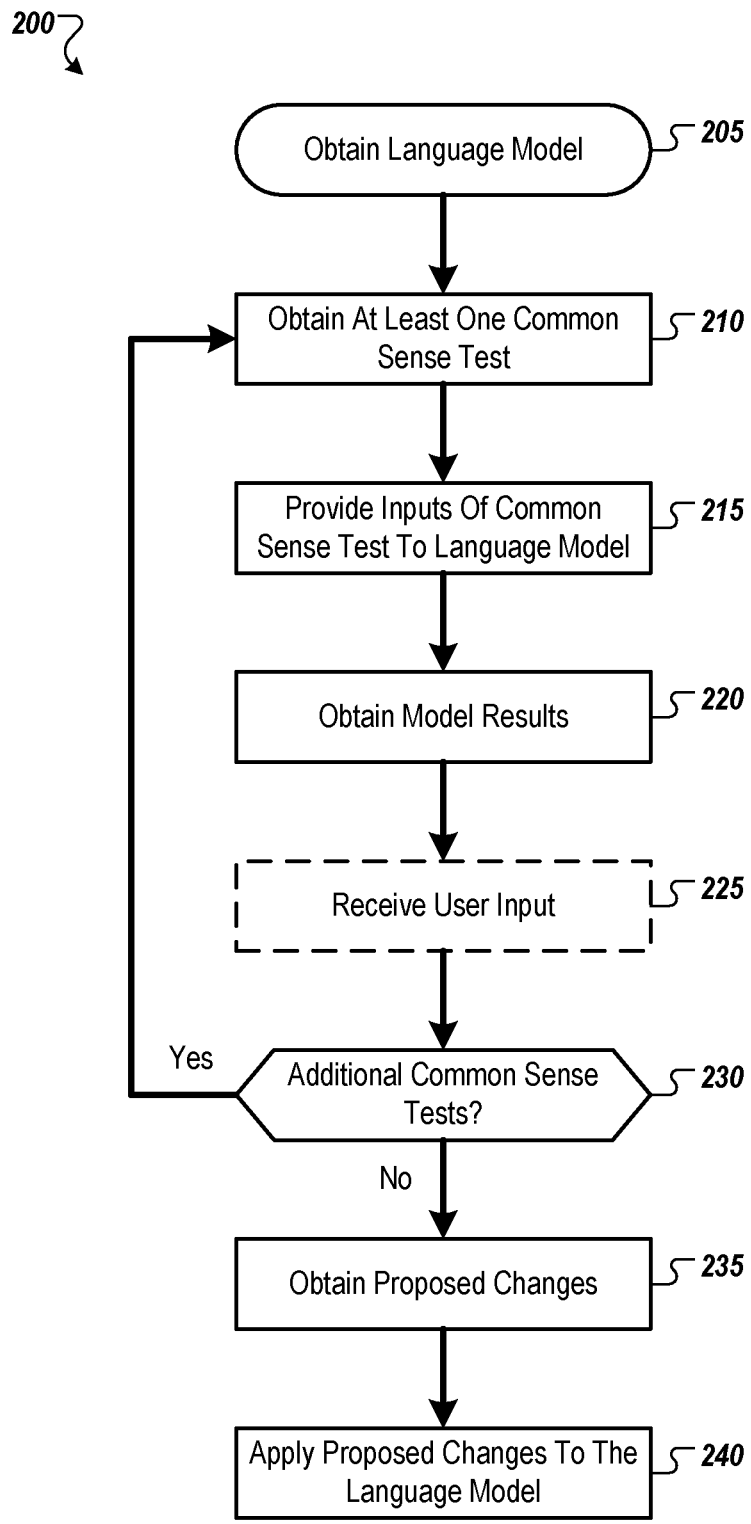
FIG. 2 is a flowchart of example operations for auditing a language model through common sense reasoning tasks.

FIG. 2 is a flowchart of example operations 200 for auditing a language model through common sense reasoning tasks, in accordance with at least one embodiment of the present disclosure.

The operations 200 may begin at block 205 where a language model may be obtained. The language model may be analogous to the language model 105 of FIG. 1.

At block 210, at least one common sense test may be obtained. The common sense tests may be analogous to the common sense tests 110 of FIG. 1. For example, the common sense tests may include a crystallized ability test, a prototype analysis test, a rediscovery test, and a tacit knowledge test. Alternatively, or additionally, more or less common sense tests may be obtained.

At block 215, inputs from the obtained common sense test of block 210 may be provided to the language model obtained at block 205. The inputs may vary between different common sense tests. Alternatively, or additionally, multiple common sense tests may include the same or similar inputs, but inputs for different common sense tests may cause the language model to produce different outputs in response to the inputs.

At block 220, model results may be obtained from the language model in response to the inputs from the common sense test. In some embodiments, the model results may be associated with portions of the common sense test that the language model fails, substantially fails, or partially fails. The model results may be analogous to the model results 120 of FIG. 1.

At block 225, user input may be obtained. The user input may contribute to the model results obtained at block 220. For example, the user input may include validating results that may be autonomously generated and/or providing additional model results based on a user analysis. The user input may be analogous to the user input 130 of FIG. 1.

At block 230, it may be determined whether more common sense tests are available to be provided to the language model. In instances in which more common sense tests are available, the operations 200 may obtain the additional common sense test at block 210 and may perform blocks 215 through 225 with respect to the additional common sense test. In instances in which no more common sense tests are available, the operations 200 may continue to block 235 as described herein.

At block 235, proposed changes may be obtained. In some embodiments, the proposed changes may be in response to the model results. The proposed changes may be analogous to the proposed changes 125 of FIG. 1.

At block 240, the proposed changes may be applied to the language model. In some embodiments, applying the proposed changes to the language model may contribute to the language model including a greater amount of common sense reasoning. For example, a first language model may apply the proposed changes may be more likely to pass future common sense tests than a second language model that may not apply the proposed changes.

Modifications, additions, or omissions may be made to the operations 200 without departing from the scope of the present disclosure. For example, in some embodiments, a second user input may be received in conjunction with the proposed changes. The second user input may be the same or similar as the user input at block 225, which may include validating autonomously proposed changes and/or providing additional proposed changes based on a user analysis Alternatively, or additionally, the operations 200 may include any number of other components that may not be explicitly illustrated or described.

Figure 3:
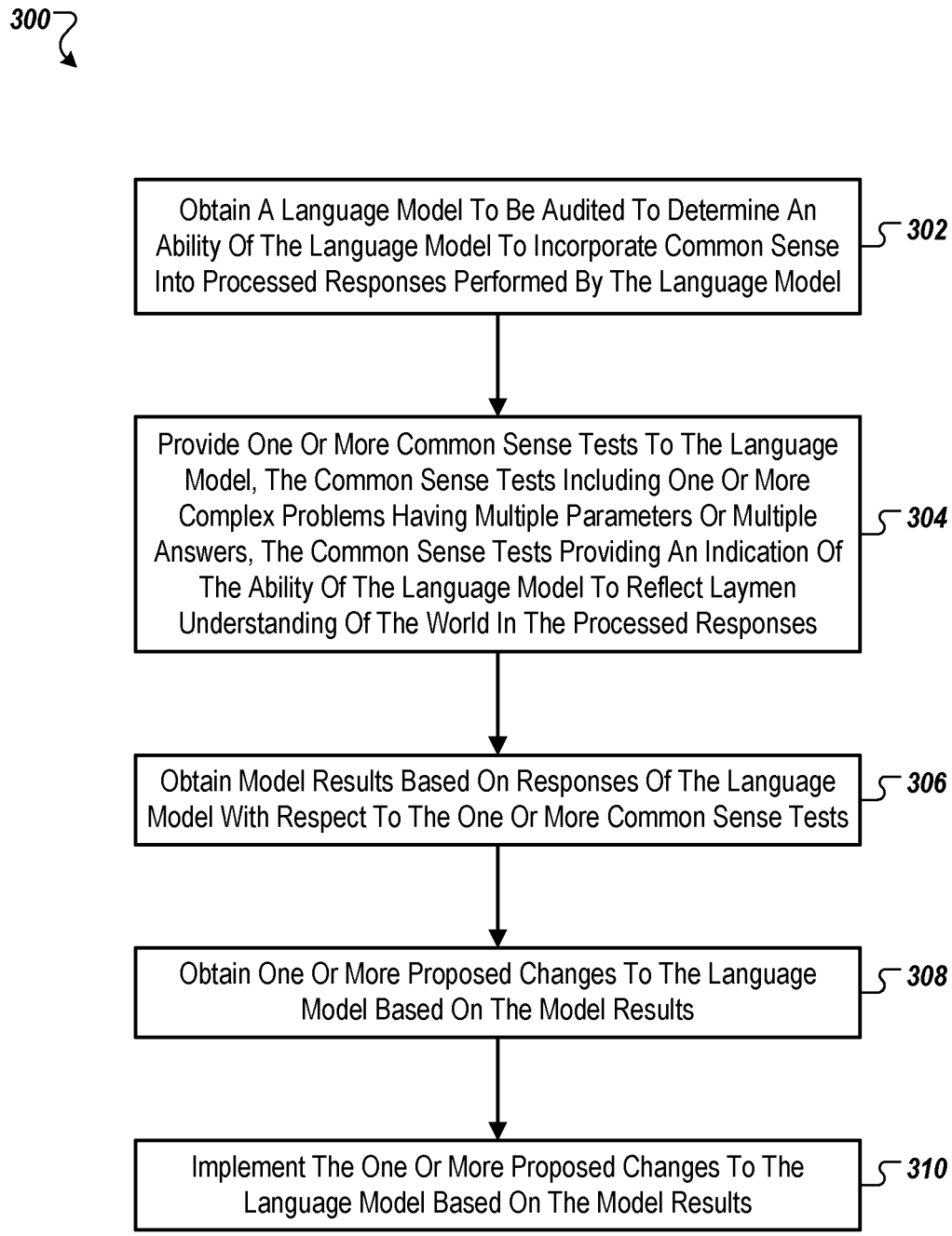
FIG. 3 is a flowchart of another example method for auditing a language model through common sense reasoning tasks.

FIG. 3 is a flowchart of an example method 300 for auditing a language model through common sense reasoning tasks, in accordance with at least one embodiment of the present disclosure. One or more operations of the method 300 may be performed, in some embodiments, by a device or system, or combination of devices or systems. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 302 where a language model may be obtained to be audited. The audit of the language model may determine an ability of the language model to incorporate common sense into processed responses performed by the language model.

At block 304, one or more common sense tests may be provided to the language model. In some embodiments, the common sense tests may include one or more complex problems that may include multiple parameters or multiple answers. In some embodiments, the common sense tests may provide an indication of the ability of the language model to reflect laymen understanding of the world in the processed responses. In some embodiments, the common sense tests may include at least one of a crystallized ability test, a prototype analysis test, a rediscovery test, and a tacit knowledge test. In some embodiments, the one or more common sense tests may include ill-defined problems such that each of the one or more common sense tests may include more than one answer.

In some embodiments, the crystallized ability test may include providing a cryptogram to the language model for the language model to determine a cipher to the cryptogram using machine learning. The crystallized ability test may include monitoring multiple steps taken by the language model in determining the cipher.

In some embodiments, the prototype analysis test may include providing a textual description and a query instance to the language model. The prototype analysis test may include obtaining one or more first descriptors that may include a first relationship with the query instance. The first relationship may include a taxonomically linguistic relationship with the query instance. The prototype analysis test may include obtaining one or more second descriptors that may include a second relationship with the query instance. The second relationship including an illustrative application of the query instance. The prototype analysis test may include obtaining an updated textual description which may include an updated query instance including at least one of the first descriptors or the second descriptors.

In some embodiments, the rediscovery test may include providing a textual description to the language model. The rediscovery test may include obtaining a first proverb that may include a summary the textual description. Alternatively, or additionally, the rediscovery test may include obtaining a second proverb that may include an opposite summary of the textual description. Alternatively, or additionally, the rediscovery test may include obtaining a third proverb that may include a summary of the textual description that may be in a different language than the first proverb.

In some embodiments, the tacit knowledge test may include providing one or more antecedents to the language model. The tacit knowledge test may include obtaining, from the language model, in response to the one or more antecedents, one or more consequences to the one or more antecedents.

At block 306, model results may be obtained based on responses of the language model with respect to the one or more common sense tests. In some embodiments, the model results may be generated in response to user input which may be based on an analysis of the responses of the language model.

At block 308, one or more proposed changes may be obtained by the language model based on the model results.

At block 310, the one or more proposed changes may be implemented by the language model based on the model results. In some embodiments, the proposed changes may be obtained from user input that may be based on an analysis of the model results by one or more users.

Modifications, additions, or omissions may be made to the method 300 without departing from the scope of the present disclosure. For example, in some embodiments, the method 300 may include applying weights to the one or more model results in response to obtaining a language model setting. The method 300 may include obtaining a robustness score associated with model results based on the language model setting. The robustness score may include a numeric associated with the weights in view of the model results completion of the common sense tests. In some embodiments, the robustness score may provide an indication of whether the language model may be ready for implementation and/or whether the language model may benefit from implementing one or more proposed changes.

Figure 4:
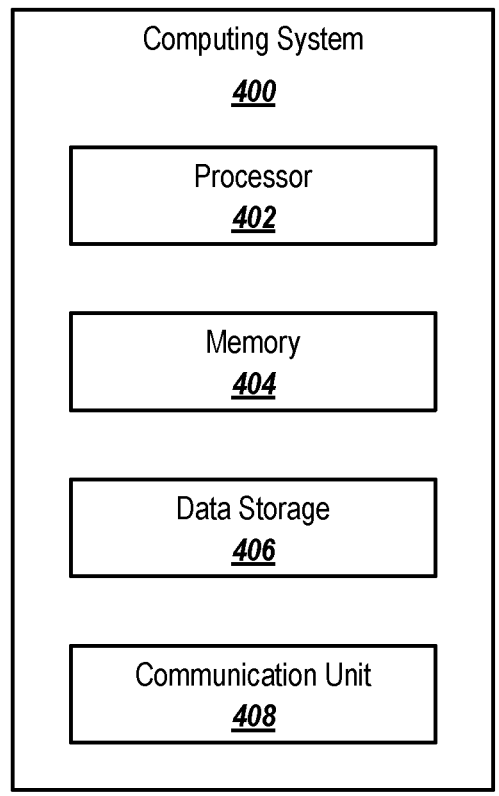
FIG. 4 illustrates an example computing system that may be used for auditing a language model through common sense reasoning tasks.

FIG. 4 illustrates an example computing system 400 that may be used for auditing a language model through common sense reasoning tasks, in accordance with at least one embodiment of the present disclosure. The computing system 400 may be configured to implement or direct one or more operations associated with auditing a language model through common sense reasoning tasks, which may include operation of the language model 105 of FIG. 1 and/or operations associated with auditing the language model 105. The computing system 400 may include a processor 402, memory 404, data storage 406, and a communication unit 408, which all may be communicatively coupled. In some embodiments, the computing system 400 may be part of any of the systems or devices described in this disclosure.

For example, the computing system 400 may be configured to perform one or more of the tasks described above with respect to the language model 105, the common sense tests 110, the model results 120, and/or the proposed changes 125.

The processor 402 may include any computing entity, or processing device including various computer hardware or software modules and may be configured to execute instructions stored on any applicable computer-readable storage media. For example, the processor 402 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 402 may include any number of processors distributed across any number of networks or physical locations that are configured to perform individually or collectively any number of operations described herein.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

For example, in some embodiments, the processor 402 may be configured to interpret and/or execute program instructions and/or process data stored in the memory 404, the data storage 406, or the memory 404 and the data storage 406. The program instruction and/or data may be related to multi-channel bonding such that the computing system 400 may perform or direct the performance of the operations associated therewith as directed by the instructions. In these and other embodiments, the instructions may be used to perform the operations 200 of FIG. 2, and/or the method 300 of FIG. 3.

The memory 404 and the data storage 406 may include computer-readable storage media or one or more computer-readable storage mediums for carrying or having computer-executable instructions or data structures stored thereon. Such computer-readable storage media may be any available media that may be accessed by a computer, such as the processor 402.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 402 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007). Combinations of the above may also be included within the scope of computer-readable media.

The communication unit 408 may include any component, device, system, or combination thereof that is configured to transmit or receive information over a network. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMax device, cellular communication facilities, etc.), and/or the like. The communication unit 408 may permit data to be exchanged with a network and/or any other devices or systems described in the present disclosure.

Modifications, additions, or omissions may be made to the computing system 400 without departing from the scope of the present disclosure. For example, in some embodiments, the computing system 400 may include any number of other components that may not be explicitly illustrated or described. Further, depending on certain implementations, the computing system 400 may not include one or more of the components illustrated and described.

As indicated above, the embodiments described herein may include the use of a computing system (e.g., the processor 402 of FIG. 4) including various computer hardware or software modules. Further, as indicated above, embodiments described herein may be implemented using computer-readable media (e.g., the memory 404 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining a language model to be audited to determine an ability of the language model to incorporate common sense into processed responses performed by the language model;
    providing a plurality of common sense tests to the language model in which two or more of the plurality of common sense tests correspond to different types of common sense tests, the plurality of common sense tests individually including one or more complex problems having multiple parameters or multiple answers, the plurality of common sense tests individually providing an indication of the ability of the language model to reflect laymen understanding of the world in the processed responses and including two or more of a crystallized ability test, a prototype analysis test, a rediscovery test, or a tacit knowledge test;
    obtaining model results based on the processed responses of the language model with respect to the plurality of common sense tests;
    determining, based on the model results, a first common sense reasoning ability of the language model with respect to a first type of common sense test;
    determining, based on the model results, a second common sense reasoning ability of the language model with respect to a second type of common sense test;
    obtaining one or more proposed changes to the language model based on one or more of the first common sense reasoning ability or the second common sense reasoning ability; and
    implementing the one or more proposed changes to the language model.

2. The method of claim 1, wherein the crystallized ability test comprises providing a cryptogram to the language model for the language model to determine a cipher to the cryptogram using machine learning, the crystallized ability test indicating a plurality of steps taken by the language model in determining the cipher.

3. The method of claim 1, wherein the prototype analysis test comprises:
    providing a textual description and a query instance to the language model;
    obtaining one or more first descriptors having a first relationship with the query instance, the first relationship including a taxonomically linguistic relationship with the query instance;
    obtaining one or more second descriptors having a second relationship with the query instance, the second relationship including an illustrative application of the query instance; and
    obtaining an updated textual description using an updated query instance including at least one of the first descriptors or the second descriptors.

4. The method of claim 1, wherein the rediscovery test comprises:
    providing a textual description to the language model; and
    obtaining one or more of:
    a first proverb that includes a summary of the textual description;
    a second proverb that includes an opposite summary of the textual description; or
    a third proverb that includes a summary of the textual description in a different language than the first proverb.

5. The method of claim 1, wherein the tacit knowledge test comprises:
    providing one or more antecedents to the language model; and
    obtaining, from the language model, in response to the one or more antecedents, one or more consequences to the one or more antecedents.

6. The method of claim 1, further comprising:
    in response to obtaining a language model setting, applying weights to the model results; and
    obtaining a robustness score associated with the model results based on the language model setting, the robustness score including a numeric associated with the weights in view of completion of the plurality of common sense tests as indicated by the model results.

7. The method of claim 1, wherein the model results are generated in response to user input based on an analysis of the processed responses of the language model.

8. The method of claim 1, wherein the proposed changes are obtained from user input that is based on an analysis of the model results by one or more users.

9. The method of claim 1, wherein the plurality of common sense tests include ill-defined problems.

10. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtaining a language model to be audited to determine an ability of the language model to incorporate common sense into processed responses performed by the language model;
providing a plurality of common sense tests to the language model in which two or more of the plurality of common sense tests correspond to different types of common sense tests, the plurality of common sense tests individually including one or more complex problems having multiple parameters or multiple answers, the plurality of common sense tests individually providing an indication of the ability of the language model to reflect laymen understanding of the world in the processed the processed responses and including two or more of a crystallized ability test, a prototype analysis test, a rediscovery test, or a tacit knowledge test;
obtaining model results based on responses of the language model with respect to the plurality of common sense tests;
determining, based on the model results, a first common sense reasoning ability of the language model with respect to a first type of common sense test;
determining, based on the model results, a second common sense reasoning ability of the language model with respect to a second type of common sense test;
obtaining one or more proposed changes to the language model based on one or more of the first common sense reasoning ability or the second common sense reasoning ability; and
implementing the one or more proposed changes to the language model.

11. The system of claim 10, wherein the crystallized ability test comprises providing a cryptogram to the language model for the language model to determine a cipher to the cryptogram using machine learning, the crystallized ability test including monitoring a plurality of steps taken by the language model in determining the cipher.

12. The system of claim 10, wherein the prototype analysis test comprises:
providing a textual description and a query instance to the language model;
obtaining one or more first descriptors having a first relationship with the query instance, the first relationship including a taxonomically linguistic relationship with the query instance;
obtaining one or more second descriptors having a second relationship with the query instance, the second relationship including an illustrative application of the query instance; and
obtaining an updated textual description using an updated query instance including at least one of the first descriptors or the second descriptors.

13. The system of claim 10, wherein the rediscovery test comprises:
providing a textual description to the language model; and
obtaining one or more of:
a first proverb that includes a summary of the textual description;
a second proverb that includes an opposite summary of the textual description; or
a third proverb that includes a summary of the textual description in a different language than the first proverb.

14. The system of claim 10, wherein the tacit knowledge test comprises:
providing one or more antecedents to the language model; and
obtaining, from the language model, in response to the one or more antecedents, one or more consequences to the one or more antecedents.

15. The system of claim 10, further comprising:
in response to obtaining a language model setting, applying weights to the model results; and
obtaining a robustness score associated with the model results based on the language model setting, the robustness score including a numeric associated with the weights in view of completion of the plurality of common sense tests as indicated by the model results.

16. The system of claim 10, wherein the model results are generated in response to user input based on an analysis of the processed responses of the language model.

17. The system of claim 10, wherein the proposed changes are obtained from user input that is based on an analysis of the model results by one or more users.

18. The system of claim 10, wherein the plurality of common sense tests include ill-defined problems.

\* \* \* \* \*